Nov. 6, 1962 R. L. ZOOK 3,062,489
LAMP MOUNTING
Filed March 20, 1961 2 Sheets-Sheet 1
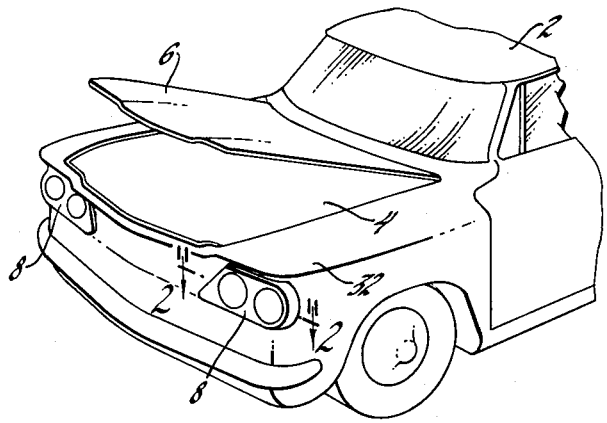
Fig. 1
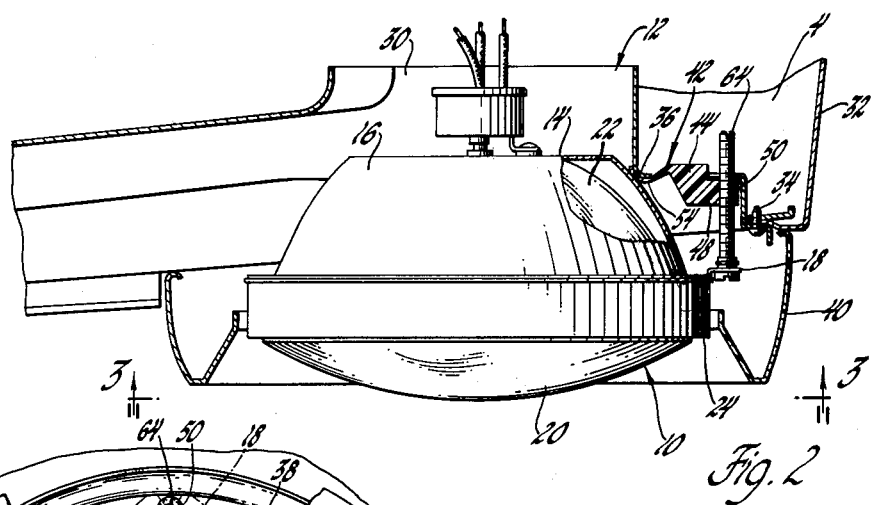
Fig. 2
Fig. 3
INVENTOR.
Robert L. Zook
BY
ATTORNEY Nov. 6, 1962 R. L. ZOOK 3,062,489
LAMP MOUNTING Filed March 20, 1961 2 Sheets-Sheet 2

INVENTOR.
Robert L. Zook
BY
ATTORNEY

United States Patent Office 3,062,489
Patented Nov. 6, 1962

3,062,489
LAMP MOUNTING
Robert L. Zook, Anderson, Ind., assignor to General Motors Corporation, Detroit, Mich., a corporation of Delaware
Filed Mar. 20, 1961, Ser. No. 96,976
7 Claims. (Cl. 248—27)

This invention relates to a lamp mounting and, more particularly, to a ball and socket type mounting for vehicle headlamps.

Lamp mountings referred to herein as being of the ball and socket type are well known in the art, and are used to mount headlamps on vehicles. A typical type of ball and socket lamp mounting is shown in the U.S. patent issued to Mead No. 2,266,329, and comprises a ball member, a socket member and means operatively interconnecting said members for adjustably mounting the ball member in the socket member. The ball member of a typical assembly includes a sealed beam projection lamp operatively secured within a mounting ring having a bearing surface adjustably mounted within a socket member on a support adapted to be fixedly secured to a vehicle. A plurality of fastening means each including an aiming screw connected to the mounting ring and threadably engaging a nut carried by the support member permit selective adjustment of the mounting ring within the socket to aim the lamp, and retain the mounting ring and lamp in any selected position. Furthermore, it has been the practice to rivet or otherwise rigidly secure a bracket to the support member of the ball and socket mounting, and to mount the aiming nut on this bracket.

After installing such a ball and socket mounting on a vehicle, including a headlamp in the mounting ring, an annular bezel or trim door has been suitably secured in front of the assembly and generally adjacent the periphery of the lamp so as to enclose from view the fastening means or aiming screws aforementioned. Thus, in order to adjust the aiming screws to adjust the aim of the lamp, it has been necessary to remove this door to permit access to the aiming screws with a suitable instrument such as a screwdriver.

It is a principal object and feature of this invention to provide an improved lamp mounting of the ball and socket type aforementioned which will facilitate assembly of the construction and reduce its cost, while providing greater flexibility in aiming of the lamp assembly.

More specifically, it is an object and feature of this invention to provide an improved ball and socket headlamp mounting in which an aiming nut may be mounted on the support member of the assembly in such a manner as to eliminate the need for a separate support bracket for the nut as well as rivets or other fasteners heretofore used in the prior art to hold such a bracket on the support.

It is yet another specific object of this invention to provide an improved ball and socket type of lamp mounting characterized by an aiming screw threadably engaging an aiming nut and accessible not only from the front of the lamp assembly but also from the rear thereof to permit aiming of the lamp without removing the usual trim door or bezel of the lamp assembly.

It is yet another object and feature of this invention to provide a lamp mounting including an aiming nut which may be mounted on the support member of the lamp mounting without the use of rivets or other fasteners, and further characterized by an opening in the support receiving the inner end of the usual aiming screw to permit adjustment of the aim of the lamp from behind the lamp support and without removing the usual bezel or trim door of the lamp assembly.

In general, these and other objects, features and advantages of the invention are attained in a headlamp mounting of the ball and socket type comprising a lamp-receiving mounting ring having a bearing surface, and a support including a socket for the mounting ring. Plural fastening means are provided for adjustably mounting the mounting ring in the aforementioned socket to adjust the aim of the lamp and then retain the lamp in a preselected aimed position. Each of these fastening means comprises an aiming nut having a bore therethrough and locking means thereon whereby the nut assembly may be inserted within an opening in the support member of the mounting and retained on the support by cooperation of the locking means with opposite walls of the support. The bore of the aiming nut is so aligned with respect to the opening through the support as to receive the inner end of an aiming screw having its other end operatively secured to the mounting ring and the intermediate portion thereof threadably engaged in the bore of the nut. Consequently, the aiming nut is mounted on the support member without the use of rivets or other fasteners, and the aiming screw may be adjusted from the rear of the support in order to aim the lamp without requiring removal of the usual trim door or bezel at the front of the headlamp assembly.

These and other objects and features of the invention and the manner in which they are attained will become more apparent hereinafter as the description of the invention proceeds, and in which reference is made to the drawings in which:

FIGURE 1 is a fragmentary perspective view of a vehicle equipped with a preferred embodiment of the invention;

FIGURE 2 is an enlarged view taken on line 2—2 of FIGURE 1;

FIGURE 3 is a view taken on line 3—3 of FIGURE 2;

Figure 4:
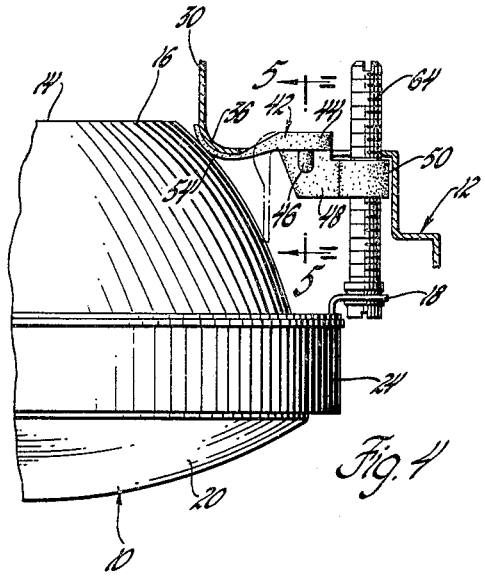
FIGURE 4 is an enlarged view of a portion of FIGURE 2.
Figure 5:
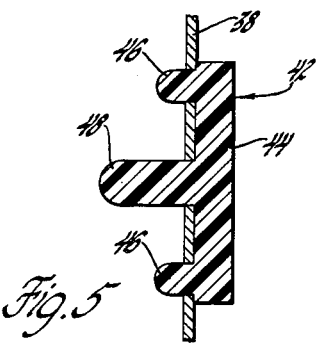
FIGURE 5 is an enlarged view taken on line 5—5 of FIGURE 4.
Figure 6:
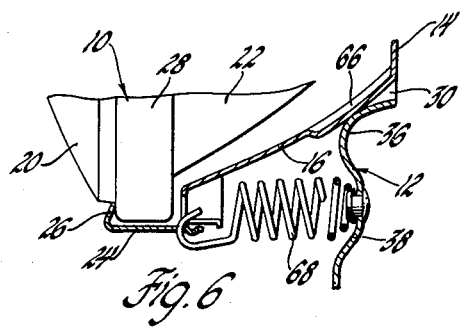
FIGURE 6 is a view taken on line 6—6 of FIGURE 3.
Figure 7:
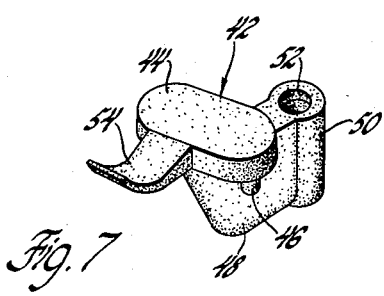
FIGURE 7 is a perspective view of a nut assembly used in the inventive structure.

Referring now to the drawings and a preferred embodiment of the invention, FIGURE 1 illustrates a vehicle 2 of a well known type characterized by rear engine drive and a luggage compartment 4 located in the front of the vehicle and adapted to be closed by a hinged hood or cover 6. Dual headlamp assemblies 8 are mounted on each side of the front end of the vehicle and, as will appear hereinafter, are accessible from within the luggage compartment of the vehicle.

As will be appreciated by those acquainted with this art, the dual lamp assemblies 8 are substantially identical and preferably, the individual mountings of the lamps of each dual lamp assembly are likewise substantially identical. Consequently, the description of the invention which follows will be made with reference to the mounting assembly associated with one of the lamps illustrated in FIGURE 1, it being understood that a generally identical assembly is used in mounting each lamp of each dual lamp assembly.

As shown particularly in FIGURES 2 through 4 and 6, each lamp mounting comprises a ball member 10 and a support 12 including a socket member to be described. The ball member 10 includes a cup-shaped mounting ring 14 having a substantially spherical annular exterior bearing surface 16, and a plurality of radially outwardly projecting ears 18. A lamp, herein shown to be of the sealed beam type, includes hermetically sealed lens and reflector elements 20 and 22, respectively. The reflector may have any suitable conformation for directing light rays to the lamp lens, and seats within the mounting ring 14. An annular retaining ring 24 is secured to the mounting ring in a well known manner, and includes a radially inwardly bent annular lip 26 which engages an annular flange 28 on the lamp to retain the latter in the mounting ring. Thus, the ball member 10 of the mounting assembly includes the mounting ring 14, the lamp, and retaining ring 24 which are operatively secured together as a unit.

The support member 12 comprises a housing 30 which, as will be apparent, is adapted to be rigidly secured to the fender panels 32 of the vehicle as by a suitable number of fasteners 34. This housing includes a rolled rim 36 forming a socket to receive the mounting ring 14, and a channel 38 surrounding the socket 36.

With the support member 12 secured to the vehicle as aforedescribed and the ball member 10 mounted therein in a manner to be described hereinafter, an annular bezel or door 40 is suitably rigidly secured in the usual manner to the support 12. Such a trim door encloses the aiming means provided for adjustably positioning the ball member within its socket for the purpose of aiming the lamp, and which means will now be described. Furthermore, it will be noted that support 12 is accessible from the rear through vehicle compartment 4.

The drawings illustrate an aiming nut assembly 42 in the form of an integral bracket preferably made of nylon or similar material. This aiming nut assembly or integral bracket comprises a flat elongate base member 44 having a pair of aligning pins 46 projecting from one surface thereof. A relatively narrow rib 48 is formed integral with the base member 44, and projects from the aforementioned surface thereof between the aligning pins 46. The rib 48 extends beyond one long edge of the base member and terminates in an integral aiming nut 50. The aiming nut includes a bore 52 which may be threaded or may be self-tapping upon engagement with the threaded aiming screw to be described. Furthermore, a bearing finger 54 is integrally joined to the base member 44 and has a curvature so as to wrap about the rolled rim 36 upon installation on the support 12 as will be described hereinafter. The joint between the bearing finger 54 and the base member 44 is flexible to permit movement of the bearing finger to the position shown in dotted lines in FIGURE 4 for installation of the assembly on the support, it being understood that the finger will assume the full line unflexed position of this figure upon being released.

Figure 8:
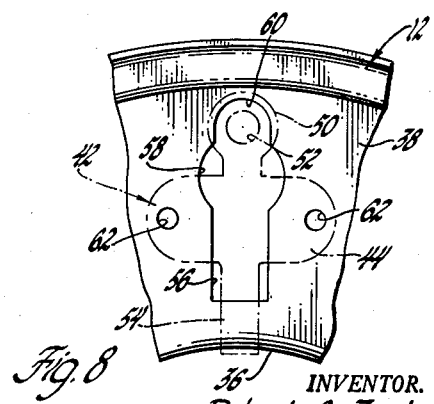
FIGURE 8 is an enlarged view of a portion of FIGURE 3 illustrating certain details of the invention.

Referring now particularly to FIGURE 8, a pair of keyhole slots are formed through channel 38 of housing 30. Each has the usual shape in that it comprises a relatively narrow elongate portion 56 terminating in a generally circular head portion 58 having a diameter greater than the width of the portion 56. A further slot 60 opens into head portion 58 opposite slot portion 56 and has a width corresponding generally to that of the latter. Furthermore, a pair of locating apertures 62 are provided through the wall of the channel 38 so that one of these apertures is located on each side of the keyhole slot.

Referring now particularly to FIGURE 4, a nut assembly or bracket 42 is adapted to be removably mounted on the channel 38 of the housing 30 by flexing the bearing finger 54 toward the axis of the bore of aiming nut 50 as illustrated in dotted lines. The flexed finger 54 and rim 48 are then inserted through the narrow portion 56 of the keyhole slot, while the nut 50 passes through the head portion 58 of the keyhole slot. After so inserting the nut assembly, it is then shifted end-wise of the keyhole slot to align the bore 52 of the nut with opening 60 in channel 38 and seat the rear surface of the nut against the shoulder formed by the wall of the channel immediately adjacent the opening 60. The relative dimensioning of the parts is such that shifting of the assembly in this manner causes the aligning pins 46 to find their respective seats within the apertures 62 at which time a face of the base member 44 is fitted flush against the rear wall of the channel 38 and the aiming nut is seated against the front wall of the channel as aforedescribed, thus locking the bracket to the channel. The finger 54 is then released so as to return to its normal unstressed or unflexed position indicated in full lines in FIGURE 4 in which it wraps about the rolled rim 36 for bearing engagement with the spherical surface 16 of the mounting ring.

An aiming screw 64 is associated with each nut 50, and each has a neck portion seated within a slot in an ear 18 of the mounting ring and is threaded so as to be adjustably received within the bore 52 of the nut for mounting and aiming the lamp. The aiming screw is sufficiently long so that, upon mounting the mounting ring in its installed position, the inner end of the screw extends through opening 60 for access from the rear thereof through vehicle compartment 4. Both ends of each screw are slotted to receive a screwdriver for adjustment thereof.

In order to provide means for adjusting the ball member of the mounting assembly in both a vertical plane and a horizontal plane, two nut assemblies 42 in cooperating slot constructions as aforedescribed are provided on the channel 38, and are spaced 90 degrees from each other. The bearing finger 54 of each of the nut assemblies engages the bearing surface 16 of the mounting ring so as to actually form the direct support for the mounting ring. Moreover, a third bearing between the mounting ring and the rolled rim socket 36 is provided by a short rib 66 pressed or otherwise formed out of the surface 16 of the mounting ring and is seated on the rolled rim 36. As usual, a coiled spring 68 extends between the ball member 10 and support 12 and cooperates with the aiming screws to hold the ball member in its socket. It will be noted that the bearing fingers 54 and the rim 66 form an antifriction bearing between the mounting ring 14 and socket 36 by reducing the area of frictional contact therebetween. Thus, the aiming screws 64 may be adjusted against or in concert with the action of the spring 68 to swivel the ball member within the socket.

In order to adjust the aim of such a lamp mounting on a vehicle as taught in the prior art, it has been necessary to remove the trim door 40 for access to the heads of the aiming screws 64. While adjustment of lamp aim in this manner may still be accomplished in the assembly aforedescribed, it is also possible to adjust headlamp aim without removing the trim door thereby permitting aiming of the lamp with much greater facility. As will be appreciated in this regard, and referring to FIGURES 1 and 2, the rear surface of the support member 12 is accessible through the luggage compartment 4 of the vehicle so that the slotted inner ends of the aiming screws may be engaged by a suitable tool to accomplish aiming of the lamp.

It will also be readily apparent from the foregoing description that the nut assembly 42 is locked within support 12 without the use of rivets or other fasteners, thereby facilitating and reducing the cost of the assembly.

While but one form of the invention has been shown and described, other forms will now be apparent to those skilled in the art. Therefore, the embodiment shown in the drawings is merely for illustrative purposes, and is not intended to limit the scope of the invention which is defined by the claims which follow.

I claim:

1. A lamp mounting of the ball and socket type comprising a lamp-receiving mounting ring, a support including a socket for said mounting ring, means for adjustably mounting said mounting ring in said socket; said means comprising an opening through said support, a nut including first and second locking means, said first locking means being yieldable relative to said nut, said nut and said first locking means being inserted into said opening whereby said first locking means yields to pass through said opening and said first and second locking means respectively engage opposite sides of said support to retain said nut thereon, and an aiming screw operatively connected to said mounting ring and threadably engaged in said nut.

2. A lamp mounting of the ball and socket type comprising a lamp-receiving mounting ring, a support including a socket for said mounting ring, means for adjustably mounting said mounting ring in said socket; said means comprising an opening through said support, a locating aperture in said support on each side of said opening, an integral bracket including a base member having a pair of aligning pins projecting therefrom, a bearing finger integrally joined with said base member at a flexible joint and projecting from one side thereof, an aiming nut formed integral with said base member on the opposite side thereof from said finger, said bracket being inserted within said opening by flexing said finger at said joint and passing said finger and said nut through said opening followed by shifting said bracket within said opening to position said pins in said apertures and seat a portion of said nut against said support, said finger having an unflexed position in which it is interposed between and engages said socket and said mounting ring, and an aiming screw operatively connected to said mounting ring and threadably engaged in said nut.

3. A lamp mounting of the ball and socket type comprising a lamp-receiving mounting ring, a support including a socket for said mounting ring, means for adjustably mounting said mounting ring in said socket; said means comprising a keyhole slot in said support including an elongate slot portion terminating at one end thereof in an enlarged head portion, a locating aperture in said support on each side of said elongate slot portion, an integral bracket including a base member having a pair of aligning pins projecting therefrom, a bearing finger integrally joined with said base member at a flexible joint and projecting from one side thereof, a rib formed integral with said base member and projecting therefrom between said aligning pins, a nut formed integral with said rib at one end thereof on the opposite side of said base member from said finger, said bracket being inserted within said keyhole slot by flexing said finger at said joint and passing said finger and rib through said elongated slot portion and said nut through said head portion followed by shifting said bracket endwise of said keyhole slot to seat a portion of said nut on said support adjacent said keyhole slot and engaging said aligning pins in said apertures, said finger having an unflexed position in which it is interposed between and engages said socket and said mounting ring, and an aiming screw operatively connected to said mounting ring and threadably engaged in said nut.

4. A lamp mounting of the ball and socket type comprising a lamp-receiving mounting ring, a support including a socket for said mounting ring, means for adjustably mounting said mounting ring in said socket; said means comprising an opening through said support, a nut having a bore therethrough and including plural mounting means thereon, one of said mounting means being yieldable relative to said nut, said nut and the other of said mounting means being inserted into said opening whereby said one mounting means and another thereof respectively engage opposite sides of said support to retain said nut thereon with the bore thereof aligned with said opening, and an aiming screw having one end operatively connected to said mounting ring, an intermediate portion threadably engaged in said bore and the other end thereof extending through said opening for access from the rear of said support.

5. A lamp mounting of the ball and socket type comprising a lamp-receiving mounting ring, a support including a socket for said mounting ring, means for adjustably mounting said mounting ring in said socket; said means comprising an opening through said support, a nut having a bore therethrough and including first and second mounting means connected thereto, said first mounting means being yieldable relative to said nut, said nut and said first mounting means being inserted into said opening whereby said first mounting means yields to pass through said opening and said first and second locking means respectively engage opposite sides of said support to retain said nut on said support with the bore thereof aligned with said opening, and an aiming screw having one end operatively connected to said mounting ring, an intermediate portion threadably engaged within said bore and the other thereof extending through said opening for access from the rear of said support.

6. The invention as defined in claim 2 in which said nut is aligned with a portion of said opening and said aiming screw passes therethrough for access from the rear of said support.

7. The invention as defined in claim 3 in which said aiming screw extends through said support for access from the rear of the latter.

References Cited in the file of this patent

UNITED STATES PATENTS

| | | |
|---|---|---|
| 2,111,653 | Winkelmeyer | Mar. 22, 1938 |
| 2,293,222 | Sheldrick | Aug. 18, 1942 |
| 2,431,641 | Gregoire | Nov. 25, 1947 |
| 2,826,682 | Falge | Mar. 11, 1958 |